No. 788,840. PATENTED MAY 2, 1905.
A. F. MADDEN & A. J. DOTY.
DRIVING GEAR FOR AUTOMOBILES.
APPLICATION FILED SEPT. 27, 1904.
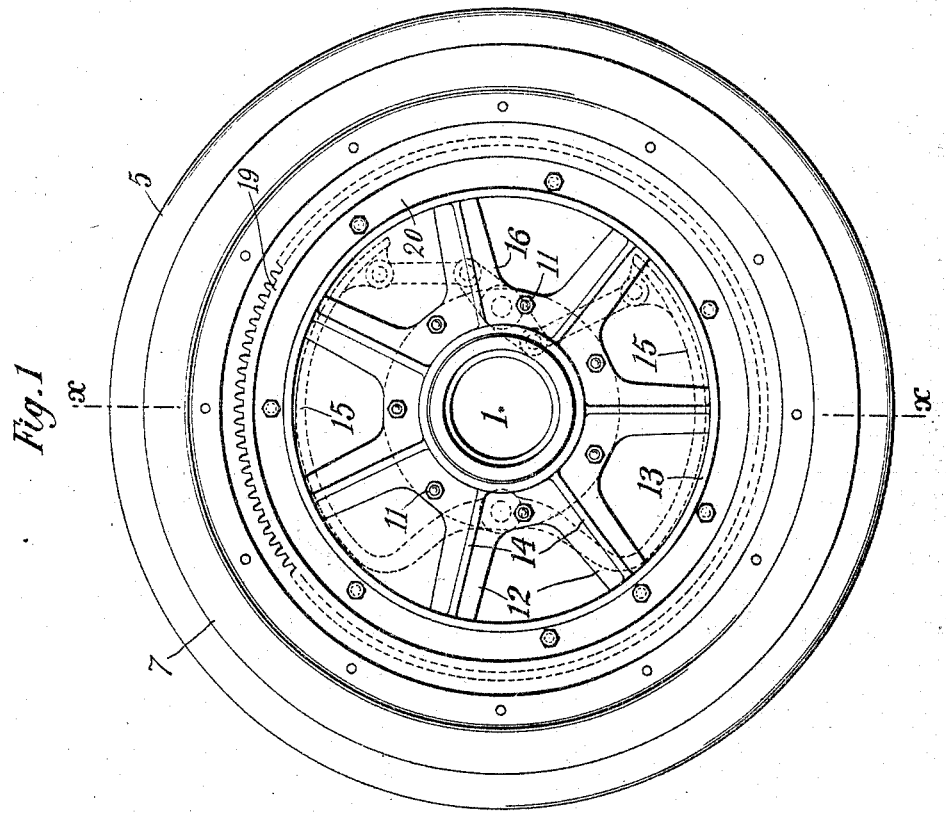
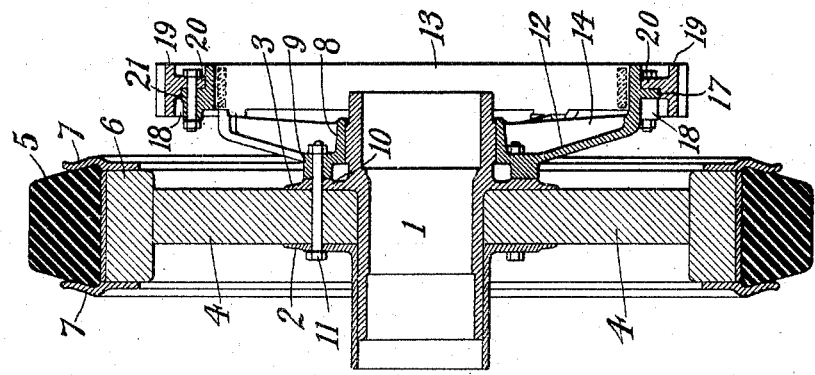
Witnesses
Raphaël Netter
A. A. Dunham
Inventors
Albert F. Madden
and Albert J. Doty
by Kerr, Page & Cooper Att'ys.

No. 788,840.

Patented May 2, 1905.

UNITED STATES PATENT OFFICE.

ALBERT F. MADDEN, OF NEWARK, NEW JERSEY, AND ALBERT J. DOTY, OF MOUNT VERNON, NEW YORK, ASSIGNORS TO VEHICLE EQUIPMENT COMPANY, OF LONG ISLAND CITY, NEW YORK, A CORPORATION OF NEW YORK.

DRIVING-GEAR FOR AUTOMOBILES.

SPECIFICATION forming part of Letters Patent No. 788,840, dated May 2, 1905.

Application filed September 27, 1904. Serial No. 226,243.

*To all whom it may concern:*

Be it known that we, ALBERT F. MADDEN, residing at Newark, county of Essex, and State of New Jersey, and ALBERT J. DOTY, residing at Mount Vernon, county of Westchester, and State of New York, citizens of the United States, have invented certain new and useful Improvements in Driving-Gears for Automobiles, of which the following is a specification, reference being had to the drawings accompanying and forming part of the same.

Our invention relates to devices for transmitting the power of the motor to the driving-wheels of the automobile, and has for its object to overcome certain defects frequently met with in driving-gears commonly in use at the present time.

In the preferred embodiment of our invention we provide a spider which has a central collar closely fitting the hub of the driving-wheel. The spider is secured to the wheel by means of bolts extending through the spoke-flanges of the hub. On the radial arms of the spider is a rim, substantially at right angles to the driving-wheel. The inner surface of the rim is suitably finished to serve as a braking-surface, against which suitable brake-shoes are pressed, preferably by means of a toggle construction. On the outside of the rim is a radial flange, to which is bolted an annulus having an inwardly-extending flange coacting with the flange on the brake-rim. The outer surface of the annulus is provided with gear-teeth, which mesh with the driving pinion or gear driven by the motor. This specific embodiment of the invention is illustrated in the accompanying drawings, in which—

Figure 1 shows in elevation a driving-wheel with the driving and braking devices carried thereby, and Fig. 2 is a section on line *x x*.

The hub of the drive-wheel is indicated by 1, and, as shown, it is composed of two parts provided with flanges 2 3, between which latter are the spokes 4. The resilient tire 5 is secured to the felly 6 by any convenient devices, as the rings 7. Mounted on the side of the hub adjacent to the vehicle-body is a spider, which has a collar 8 closely fitting the hub and provided with a flange 9, which seats upon a bearing-surface 10 on the flange 3. The spider is secured in position by the bolts, as 11, which serve to unite the two parts of the hub. The radial arms 12 of the spider carry on the side next the vehicle a rim 13, the spider being thus "dished" and the rim held a convenient distance away from the wheel. The arms are strengthened by longitudinal webs 14, the collar, arms, webs, and rims being preferably made integral with each other. The inner surface of the rim is adapted to be engaged by brake-shoes—as, for example, those indicated by 15, Fig. 1—which are connected to toggle mechanism 16 for forcing them outward against the rim, the toggle being connected with suitable actuating devices. (Not shown.)

On the outside of the rim 13 is a radial flange 17, provided at convenient intervals with studs or bosses drilled for bolt-holes. The annulus 19 has an inwardly-extending flange 20 and a shoulder 21, adapted to fit the flange 17. Bolts passing through the holes in the bosses 18 secure the annulus firmly to the flange 17, as shown. The outer side of the annulus is provided with gear-teeth, as shown, which mesh with the motor-driven gear or pinion. (Not shown.)

The advantages flowing from the construction described are numerous, among which may be mentioned the ease with which the parts can be assembled and secured in position; also, the convenience of making repairs. The teeth on the driving-gear of an automobile wear rapidly and when worn thin not only produce a disagreeable noise while in operation, but are also easily broken, especially in starting the vehicle from rest. With our construction such objectionable features are readily obviated by a new annulus, thereby making the device as good as ever. Such repairs require no skilled labor and may be made very quickly.

The specific structure herein shown and described is of course merely one embodiment of the invention and may be varied greatly without departure from the spirit of our invention. For example, the form of the spider, its hub-collar, arms, and rim may be varied almost indefinitely, and other means for securing the gear and brake annulus to the rim may be employed when convenient.

What we claim is—

1. In a propelling and braking mechanism for automobiles, the combination of a drive-wheel, a brake-rim connected thereto, and an annulus removably secured to said rim, having gear-teeth for engagement with a motor-driven gear, as set forth.

2. In a propelling and braking mechanism for automobiles, the combination of a drive-wheel, a spider secured thereto and carrying a brake-rim, and an annulus removably secured to the brake-rim, having gear-teeth for engagement with a motor-driven gear, as set forth.

3. In a propelling and braking mechanism for automobiles, the combination of a drive-wheel, a spider secured thereto, a brake-rim carried by the spider, having its inner surface adapted for engagement with brake-shoes, and an annulus outside of and secured to the brake-rim, having gear-teeth for engagement with a motor-driven gear, as set forth.

4. In a propelling and braking mechanism for automobiles, the combination of a drive-wheel, a spider secured thereto, a brake-rim carried by the spider, having its inner surface adapted for engagement with brake-shoes, and having a flange extending radially from its outer surface, and an annulus having an inwardly-extending flange removably secured to the rim-flange, and having gear-teeth on its outer face, for engagement with a motor-driven gear, as set forth.

ALBERT F. MADDEN.
ALBERT J. DOTY.

Witnesses:
M. Lawson Dyer,
S. S. Dunham.